United States Patent
Yokoyama et al.

(10) Patent No.: US 6,268,562 B1
(45) Date of Patent: Jul. 31, 2001

(54) SEALED CONTAINER AND METHOD FOR ASSEMBLING IT

(75) Inventors: Koji Yokoyama; Hideaki Satou; Minoru Sakaguchi, all of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/212,819

(22) Filed: Mar. 15, 1994

(30) Foreign Application Priority Data

Mar. 16, 1993 (JP) .................................................. 5-055401

(51) Int. Cl.$^7$ ...................................................... H05K 5/06
(52) U.S. Cl. ........................... 174/52.3; 174/30; 174/99 R
(58) Field of Search ............................ 174/52.3, 65 SS, 174/24, 28, 29, 99 B, 31.5, 99 R, 30; 277/207 A, 207 R, 211; 403/337, 336, 335

(56) References Cited

U.S. PATENT DOCUMENTS

| | | | |
|---|---|---|---|
| 767,763 | * | 8/1904 | Reinvaldt .............................. 277/211 |
| 3,291,890 | * | 12/1966 | Sweeny et al. ......................... 174/30 |
| 3,652,778 | * | 3/1972 | Sakai ...................................... 174/28 |
| 3,858,987 | * | 1/1975 | Kleinhans et al. ............... 403/336 X |
| 3,930,656 | * | 1/1976 | Jelinek ................................. 277/180 |
| 4,067,531 | * | 1/1978 | Sikula ............................... 248/358 R |
| 4,413,166 | * | 11/1983 | Meyer ................................ 200/148 B |
| 4,549,037 | * | 10/1985 | Bawa et al. ....................... 174/65 SS |
| 4,730,085 | * | 3/1988 | Hama et al. ....................... 174/14 R |
| 4,786,761 | * | 11/1988 | Hama et al. ........................ 174/28 X |
| 4,842,548 | * | 6/1989 | Bolante ................................. 439/461 |
| 5,071,140 | * | 12/1991 | Quevedo del Rio ........ 277/207 A X |

FOREIGN PATENT DOCUMENTS

| | | | |
|---|---|---|---|
| 56-44313 | | 4/1981 | (JP) . |
| 56-105154 | | 8/1981 | (JP) . |
| 5199635 | * | 8/1993 | (JP) ............................... 174/99 R X |

\* cited by examiner

Primary Examiner—Dean A. Reichard
(74) Attorney, Agent, or Firm—Mattingly, Stanger & Malur, P.C.

(57) ABSTRACT

Sheaths accommodate a high-voltage conductor in their insides, and annular grooves are respectively provided in flanges of the sheaths outwardly of inserting holes for bolts which are disposed in annular form. Annular grooves are provided in an insulating spacer inwardly of the inserting holes for the bolts. O-rings are respectively provided in the annular grooves. An annular groove is also formed in a flange connection face so as to have bolt inserting holes at its bottom. After the flanges have been fixed by using the bolts, nuts and sealing washers, a liquid packing is injected into the flange connection face groove through a liquid packing injection opening which communicates with the groove. Since a sealing element is disposed outwardly of the bolt holes, it is possible to prevent penetration of rainwater or the like into the gaps between connected flanges with airtightness being retained. It is also possible to readily inject the liquid packing into the gaps between the flanges. By using sealing washers, it is possible to more readily inject the liquid packing into the gaps between the flanges.

11 Claims, 2 Drawing Sheets

SEALED CONTAINER AND METHOD FOR ASSEMBLING IT

BACKGROUND OF THE INVENTION

The present invention relates to a sealed container and a method for assembling it and, more particularly, to a hermetically sealed connection part of a sealed container which is employed as a gas breaker or a gas-insulated switchgear which contains a high-voltage conductor or an electric power device in its inside.

Conventional types of hermetically sealed connection parts of gas-insulated switchgears or the like are disclosed in Japanese Patent Laid-Open Nos. 44313/1981 and 105154/1981. As disclosed, the sealed container of either of the gas-insulated switchgears in which high-voltage conductors are accommodated in an insulated state has the following arrangement: To retain the airtightness of the connection part, single or double grooves are respectively provided in flanges downwardly of bolt holes, and gaskets, such as O-rings, are fitted into the respective grooves to compress and deform the O-rings, whereby the resultant elastic repulsive forces are used to seal the connection part so that the internal pressurized $SF_6$ gas is prevented from leaking to the outside.

Further, to cope with corrosion of flange faces due to penetration of rainwater or the like, a liquid packing is injected under pressure through an injection opening which communicates with the inside of the flanges, thereby forming an annular gasket between the flanges to retain watertightness.

SUMMARY OF THE INVENTION

In a cold area or the like, there is the problem that rainwater penetrates into and freezes/melts in the gaps between connected flanges to cause cracking of an insulating spacer, or corrosion of a flange.

In the step of injecting a liquid packing under pressure, if the liquid packing is injected under pressure without carrying out the step of sealing the gaps between connected flanges and bolt portions, the liquid packing might leak through the gaps between the connected flanges or the bolt portions. This problem is not at all taken into account in either of the above-cited documents depicting the conventional technology.

A first object of the present invention is to provide a sealed container capable of preventing rainwater or the like from penetrating into the gaps between connected flanges.

A second object of the present invention is to improve the step of assembling a sealed container in which a liquid packing is employed between connected flanges.

The first object is achieved by providing an arrangement in which grooves are respectively provided in annular form inwardly and outwardly of inserting holes for flange fastening means, such as bolts which are disposed in annular form, wherein a sealing means, such as an O-ring, is disposed in each of the grooves.

The second object is achieved by providing an arrangement which includes an annular first groove formed in a flange connection face in such a manner as to have a flange-fastening-means inserting hole at its bottom, an annular second groove formed in the flange connection face outwardly of the flange-fastening-means inserting hole, a liquid packing injected into the first groove, and sealing means disposed in the second groove.

Since the sealing means is also disposed outwardly of the bolt holes, it is possible to prevent rainwater or the like from penetrating into the gaps between connected flanges with airtightness retained.

Further, since the sealing means is disposed outwardly of the bolt holes, it is possible to readily inject the liquid packing into the gaps between connected flanges. Particularly, by using a sealing washer, it is possible to more readily inject the liquid packing into the gaps between connected flanges.

DETAILED DESCRIPTION OF THE PREFERRED EMBODIMENT

One embodiment of the present invention will be described below with reference to the accompanying drawings.

Figure 1:
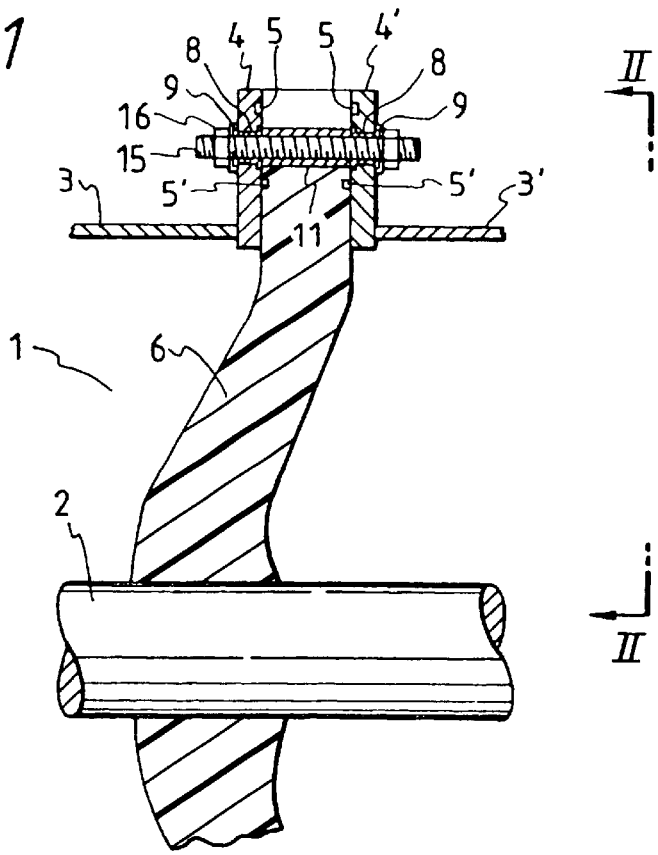
FIG. 1 is a vertical sectional view of the essential portions of a sheath connecting part to which the present invention is applied, sheaths in which a bus of a gas-insulated switchgear is accommodated being connected by the sheath connecting part.
Figure 2:
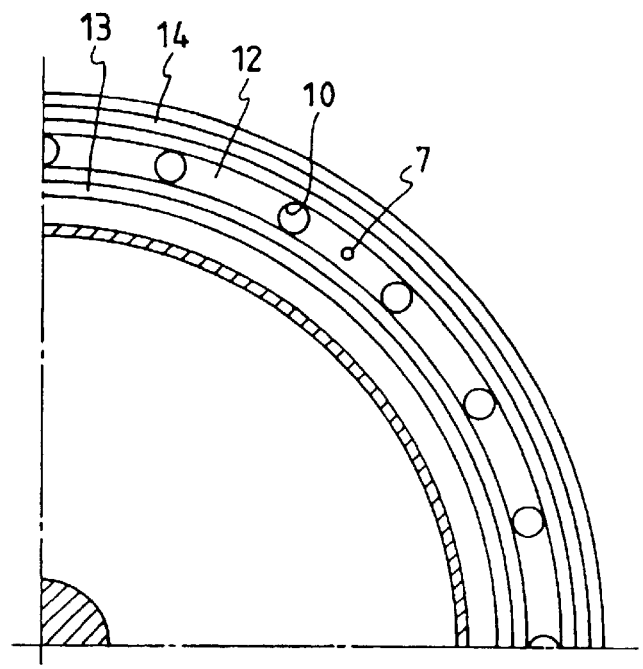
FIG. 2 is a fragmentary side elevational view of the sheath connecting part before assembly (bolts and nuts are eliminated) as viewed from line II—II of FIG. 1.
Figure 3:
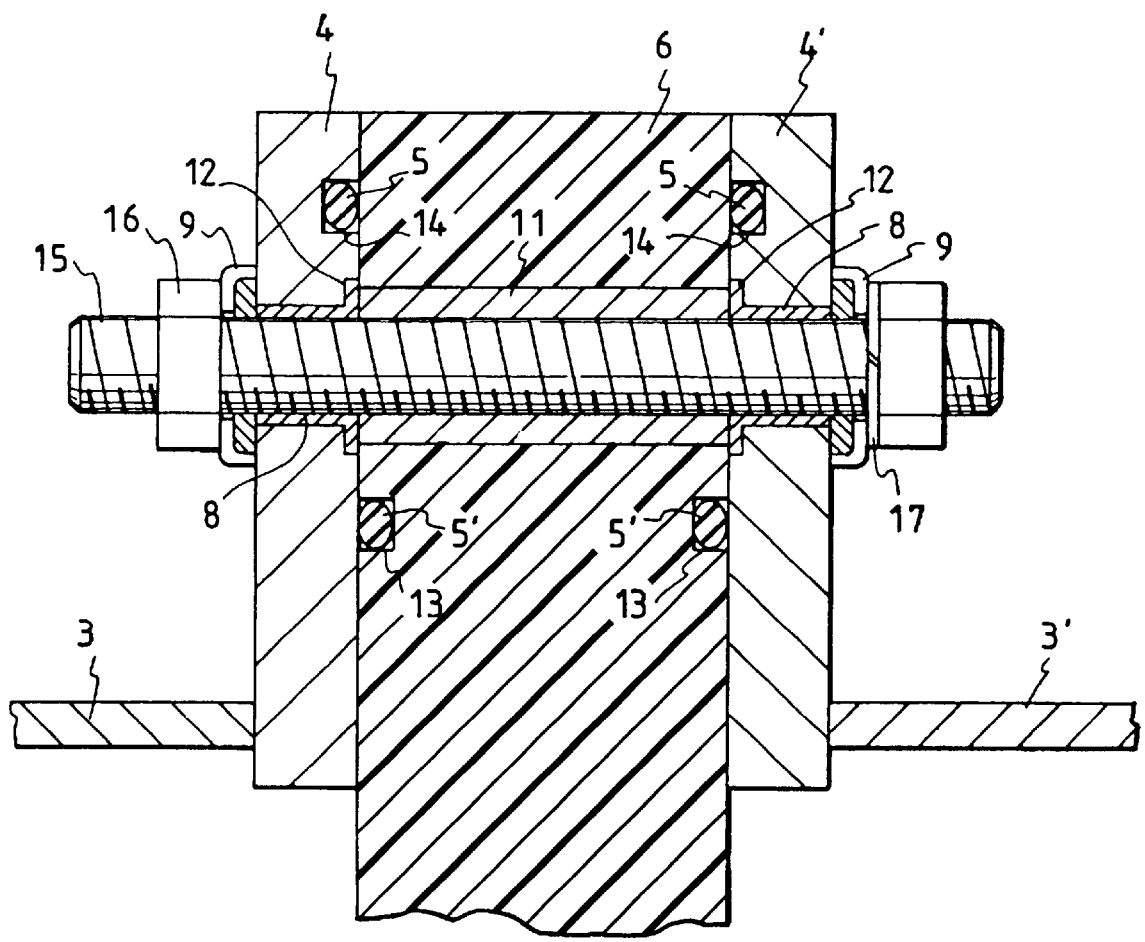
FIG. 3 is an enlarged view of the sheath connecting part of FIG. 1.

FIGS. 1–3 show an example in which the present invention is applied to sheaths which constitute sealed containers in which a high-voltage conductor of a gas-insulated switchgear is accommodated.

The inside of a sealed container 3 of the gas-insulated switchgear is filled with a pressurized $SF_6$ gas having good insulation properties, and a high-voltage conductor 2 is accommodated in the sealed container 3 in an insulated state. The high-voltage conductor 2 is supported by an insulating spacer 6 made of an epoxy resin. The insulating spacer 6 is retained between flanges 4 and 4' of a pair of sealed containers 3 and 3' which adjoin each other. A plurality of holes 10 for bolt insertion are formed in both of the flanges 4 and 4' in such a manner as to be arranged around their respective circumferences. Embedded metal members 11 are embedded in the insulating spacer 6 at locations corresponding to the holes 10. Rectangular grooves 12 of annular shape (grooves into which to insert a liquid packing 8 which will be described later), each of which has a width slightly larger than the diameters of the embedded metal members 11, are respectively formed in the opposing face portions of the flanges 4 and 4' at locations corresponding to the opposing ends of the embedded metals 11. Holes for bolt insertion are positioned at the bottoms of the rectangular grooves 12, respectively. The ends of each of the embedded metal members 11 are opposed to the respective rectangular grooves 12 in such a manner that each of the embedded metal members 11 is positioned approximately concentrically to the corresponding one of the holes for bolt insertion.

Single annular grooves 14 are respectively formed outwardly of the rectangular grooves 12, and O-rings 5 (for environmental resistance) are respectively disposed in the grooves 14. Also, single annular grooves 13 are respectively formed inwardly of the rectangular grooves 12, and O-rings 5' (for gas sealing) are respectively disposed in the grooves 13. If the sealed containers are to be installed in a cold area, cold resistant O-rings for lowest-temperature service (for example, for service down to −40° C. to −50° C.) are used as the O-rings 5, while O-rings for more moderate service (for example, down to −20° C.) are normally used as the O-rings 5'. The O-rings 5 and 5' are each compressed by 20–30%. The O-rings 5 prevent penetration of water or the like into the gaps between the insulating spacer 6 and the flanges 4 and 4' by their elastic repulsive forces, while the O-rings 5' seal the gaps between the insulating spacer 6 and the flanges 4 and 4' by their elastic repulsive forces to prevent the internal pressurized $SF_6$ gas from leaking to the outside.

A female thread is formed in the internal wall of the hollow portion of each of the embedded metal members 11. A bolt 15 is screwed into the female thread, and by fastening the bolt 15 with nuts 16 via sealing washers 9, the flanges 4 and 4' and the insulating spacer 6 are fixed to each other. Each of the sealing washers 9 has a cap-shaped body and an elastic member, such as rubber, which is disposed in the inside of the cap-shaped body. The inside elastic members are deformed by being pressed against the respective flanges 4 and 4' by the nuts 16, thereby sealing the respective gaps between the nuts 16 and the flanges 4 and 4'. A spring washer 17 is provided between at least one of the sealing washers 9 and the adjacent one of the nuts 16. To fix the flanges 4 and 4' and the insulating spacer 6 to each other, it is possible to adopt another well-known method. For example, there is a method which employs bolts each having a head. In this method, the embedded metal members 11 have no female threads, and the bolts are merely inserted into the respective embedded metal members 11 and fastened with nuts. In this case, sealing washers are fitted onto the heads of the respective bolts.

After the flanges 4 and 4' and the insulating spacer 6 have been fastened by the bolts 15 in the above-described manner, the liquid packing 8, such as a normal-temperature vulcanized rubber, is injected under pressure through an injection opening 7 which makes the rectangular groove 12 open to the outside air, by using a well-known injection gun. Although not shown, a plurality of injection openings 7 are provided so that the liquid packing 8 can be fully charged (for example, two injection openings 7 may be provided on a diagonal line). The liquid packing 8 passes through the rectangular groove 12 and is charged into the hole which surrounds the bolt 15. The liquid packing 8 may also be charged not through the injection opening 7 but through any of the holes 10 from which the bolts 15 have been removed. If the liquid packing 8 is injected through any of the holes 10, the removed bolts 15 may be fastened after the injection. If the injection opening 7 is utilized, the injection opening 7 is stopped up. If the material of the liquid packing 8 is a normal-temperature vulcanized rubber, since it is cured into a rubber-like form within several days after charging, it is not necessary to stop up the injection opening 7. The charged liquid packing 8 forms a gasket-like loop between the O-rings 5 and 5', thereby preventing corrosion or breakage due to freezing resulting from the penetration of water, such as rainwater, into the flange portion, as well as thereby preventing leakage of the $SF_6$ gas 1.

The rectangular grooves 12 may also be formed in the opposite face portions of each of the flanges 4 and 4'. The rectangular grooves 12 and the grooves 13 and 14 may be formed in either of the flanges 4 and 4' and the insulating spacer 6. However, if account is taken of the probability of cracking in the insulating spacer 6 in a cold area, it is preferable to dispose the annular grooves 14 and the O-rings 5 in the flanges 4 and 4' rather than in the insulating spacer 6 because the insulating spacer 6 can be made more resistant to cracking. Further, it is more advantageous to dispose the annular grooves 14 and the O-rings 5 as outwardly as possible. Also, by disposing the O-rings 5 in the flanges 4 and 4', it is not necessary to pay attention to the precision with which rectangular grooves are to be formed in the insulating spacer 6, whereby the cost of the insulating spacer 6 itself can be reduced. Also, the annular grooves 13 and 14 need not be single grooves, but may be double or triple grooves.

According to the above-described embodiment, since the sealing washers 9 are employed and the O-rings 5 are disposed outwardly of the bolt holes, even if the step of applying an external seal is omitted, leakage of the liquid packing 8 can be prevented, so that it is possible to greatly reduce the number of assembling steps.

The present invention can be applied not only to a flange connection part which is provided with an insulating spacer in the above-described manner, but also to a flange connection part in which no insulating spacer is inserted between flanges.

According to the present invention, it is possible to prevent rainwater or the like from penetrating into a flange connection part.

Also, according to the present invention, it is possible to easily inject a liquid packing into the gaps between flanges.

What is claimed is:

1. A sealed container containing therein a high-voltage conductor or an electric power device, and having a flange connection part in which an insulating spacer is inserted between two flanges, comprising:

inward and outward grooves provided in at least one of the insulating spacer and the flanges, said grooves being respectively provided in annular form inwardly and outwardly of flange-fastening-means inserting holes;

flange-fastening means inserted in the flange-fastening-means inserting holes;

a liquid packing injected into said flange-fastening-means inserting holes; and sealing means disposed in said respective grooves.

2. A sealed container according to claim 1, wherein said inward groove is provided in the insulating spacer.

3. A sealed container according to claim 1, wherein the sealing means disposed in said outward groove is a low-temperature O-ring which is superior in cold resistance to said sealing means disposed in said inward groove.

4. A sealed container according to claim 1, wherein said outward groove is provided in each of the flanges.

5. A sealed container having a flange connecting part, comprising:

an annular first groove formed in a flange connection face in such a manner as to have a flange-fastening-means inserting hole at a bottom thereof;

an annular second groove formed in the flange connection face outwardly of the flange-fastening-means inserting hole;

flange-fastening means inserted in the flange-fastening-means inserting hole;

a liquid packing injected into said first groove;

first sealing means disposed in said second groove;

a third groove formed in the flange connection face inwardly of the flange-fastening-means inserting hole; and second sealing means disposed in said third groove.

6. A sealed container containing therein a high-voltage conductor or an electric power device, and having a flange connection part in which an insulating spacer is inserted between two flanges, comprising:

an annular first groove formed in at least one of the insulating spacer and the flanges, wherein the insulating spacer and the flanges have flange-fastening-means inserting holes, the flange-fastening-means inserting holes of said at least one of the insulating spacer and the flanges being formed at a bottom of said annular first groove;

an annular second groove formed in at least one of the insulating spacer and the flanges outwardly of the flange-fastening-means inserting holes;

an annular third groove formed in at least one of the insulating spacer and the flanges inwardly of the flange-fastening-means inserting holes;

flange-fastening means inserted in the flange-fastening-means inserting holes;

a liquid packing injected into said first groove;

first sealing means disposed in said second groove; and second sealing means disposed in said third groove.

7. A sealed container according to claim 6, wherein said flange-fastening-means inserting holes of said insulating spacer each include an embedded metal member embedded in the insulating spacer, and wherein said first groove has a larger width than the embedded metal member and is formed in only the flanges.

8. A sealed container according to claim 6, further comprising a liquid packing injection opening for communicating with said first groove from outside of the flanges.

9. A sealed container according to claim 6, wherein said flange-fastening means comprises a bolt, a nut and a sealing washer.

10. A method for assembling a sealed container having a flange connection part, comprising the steps of:

providing an annular first groove and an annular second groove in at least one of two flanges connected in the flange connection part, the annular first groove being formed in such a manner as to have a flange-fastening-means inserting hole at a bottom thereof, and the annular second groove being provided outwardly of the flange-fastening-means inserting hole;

disposing sealing means in the second groove;

fastening the flanges together by flange-fastening means; and injecting a liquid packing into the first groove through a liquid packing injection opening provided to communicate with the first groove from outside of the flanges or by using the flange-fastening-means inserting hole.

11. A method for assembling a sealed container which contains therein a high-voltage conductor or an electric power device, and which has a flange connecting part in which an insulating spacer is inserted between two flanges, the flange connecting part including: an annular first groove formed in at least one of the insulating spacer and the flanges in such a manner as to have a flange-fastening-means inserting hole at a bottom thereof; an annular second groove formed in at least one of the insulating spacer and the flanges outwardly of the flange-fastening-means inserting hole; an annular third groove formed in at least one of the insulating spacer and the flanges inwardly of the flange-fastening-means inserting hole; a liquid packing injected into the first groove; first sealing means disposed in the second groove; and second sealing means disposed in the third groove, said method comprising the steps of:

disposing the first and second sealing means in the second groove and the third groove, respectively;

fastening the flanges together by flange-fastening means; and injecting the liquid packing into the first groove through a liquid packing injection opening for communicating with the first groove from outside of the flanges or by using the flange-fastening-means inserting hole.

\* \* \* \* \*